Dec. 27, 1955   W. E. PETERSON   2,728,868
LIQUID FILLED ACCELEROMETER
Filed Sept. 24, 1951
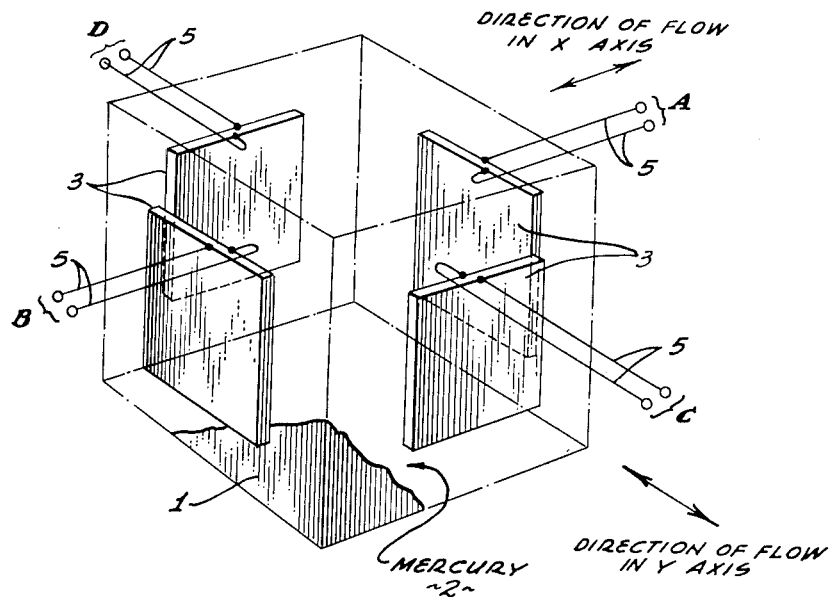
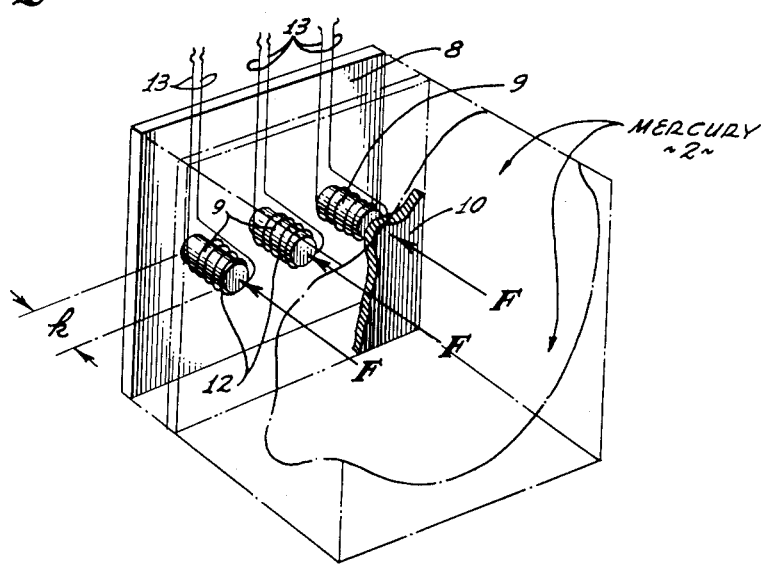
INVENTOR,
Walter E. Peterson
By Herbert E. Metcalf
His Patent Attorney ically in Figure 2 and comprises a cubical container 1 filled

United States Patent Office 2,728,868
Patented Dec. 27, 1955

2,728,868

LIQUID FILLED ACCELEROMETER

Walter E. Peterson, Los Angeles, Calif., assignor to Northrop Aircraft, Inc., Hawthorne, Calif., a corporation of California Application September 24, 1951, Serial No. 248,037

3 Claims. (Cl. 310—8.4)

This invention relates to the piezoelectric effect in crystals, to the related magnetostrictive effect in metals, and more particularly, relates to an accelerometer employing such effects to provide electrical signals proportional to linear acceleration.

Devices capable of producing energy interconversions (i. e., changing mechanical energy into electrical energy, etc.) are known generically as transducers.

The piezoelectric effect refers to the phenomenon exhibited upon the faces of certain crystals when they are submitted to pressure or tension, namely, that an electrostatic charge is produced between the opposite faces of the crystal. Hence, a crystal subjected to a stress is capable of producing voltages of magnitudes proportional to the magnitude of the applied stress. Application of alternating voltage across a crystal in such a direction that there is a component of electrical stress in the direction of an electrical axis results in the production of alternating mechanical stresses in the direction perpendicular to the axis involved.

The use of the vibrating crystal as a frequency-controlling element in a vacuum tube oscillator is well known. Usually crystals employed in electric circuits are in the form of thin slabs cut parallel to the XZ or YZ planes. Such a slab expands and contracts along an axis normal to the principal faces in the fundamental mode of oscillation, the frequency of which is expressed in the formula:

$$v = \frac{1}{2t}\sqrt{\frac{E}{\sigma}}$$

where
$v$ = frequency of the fundamental mode
$t$ = thickness of the specimen
$E$ = elasticity of the specimen
$\sigma$ = density of the specimen Were a crystal slab used to control the frequency of an oscillator, variations in the force applied to the crystal slab by virtue of the surrounding media would consequently cause small changes in the controlled frequency within the band width at which the crystal will oscillate. This frequency change can be used to determine the proportional linear acceleration when compared with a stable reference frequency or if added sensitivity is desired, compared with a similarly varying frequency of opposite sign such as produced by another crystal connected in "push-pull" as is well known in the art.

Magnetostriction refers to the change in relative dimensions of a material on magnetization. Some materials, nickel, for example, exhibit a decrease in length when magnetized. Other materials, 45 percent Permalloy, for example, exhibit an increase in length when magnetized. The use of the property of the change in dimensions of the metal in the presence of magnetic flux, and conversely the use of voltage generated in coils in proximity (in flux linkage) to metal when the metal is strained is well known.

The piezoelectric effect is embodied in a crystal type transducer; the effect of magnetostriction is utilized in a magnetostrictive-type transducer. Both effects depend on dimension change, and the present invention can utilize either one of these effects to advantage.

Briefly, the invention undergoing specification comprises a device including a container filled with a high-density liquid, such as mercury, in which suitable pressure sensitive transducers are placed so as to form a fluid-stressed or fluid activated accelerometer having an electrical output.

Electrical signals proportional to the acceleration of a body are obtained by direct utilization of the voltage output of the transducers, resulting from forces conveyed via the liquid. Furthermore, such an accelerometer can utilize a frequency change it can provide, directly or indirectly due to acceleration, by comparing said change with a stable reference frequency, and/or provide a frequency difference (from push-pull circuitry), as is well known in the art, and hence can determine the proportional linear acceleration.

It is, accordingly, an object of this invention to provide a wide range, linear, highly accurate accelerometer.

A further object of this invention is to provide a substantially frictionless support for a sensing mass in an accelerometer, and also to provide a means for efficient conversion of the energy of the sensing mass of an accelerometer into electrical energy.

Fulfillment of the foregoing objectives will overcome many of the problems of present accelerometers. The invention undergoing specification eliminates the need for bearings through utilization of a high density liquid as the sensing mass. This liquid is enclosed in a suitable, symmetrical container with transducers or end instruments positioned at certain faces of its configuration.

With leveling means provided for the container, the force components of acceleration along any desired axis of a vehicle will act upon the transducers and cause directly or indirectly frequency changes in an attached circuit, for example. The magnitudes of these electrical changes, being almost directly proportional to the accelerating force causing the said change, can be conveyed to suitable recording or indication apparatus and hence be used as a measure of acceleration.

Another exceptionally advantageous feature of the accelerometer, when the frequency change is utilized directly, is in the elimination for the need for D. C. amplifiers in the external circuitry. The signal under these conditions is readily useable for computer, such as a digital computer, input.

This invention possesses other objects and features, some of which together with the foregoing, will be set forth in the following description of a preferred embodiment of the invention, and the invention will be more fully understood by reference to the attached drawings in which:

Figure 1 is a simplified phantom perspective view of a two-axis type of accelerometer embodying the invention.

Figure 2 is a diagrammatic phantom perspective view illustrating an accelerometer using a magnetostrictive type of transducer.

Consider first the principle of operation of the accelerometer illustrated in Figure 1 which comprises a cubical container 1 filled with a suitable high-density liquid 2 such as mercury and having crystal slab transducers 3 mounted at each face upon which a force component F acts owing to an acceleration to cause a voltage or frequency change in the crystal which is conveyed to suitable recording apparatus via the leads 5.

When container 1 is accelerated the high density liquid 2 within the container is acted upon, and as a result various force components F arise which act upon certain of the transducers 3.

A magnetostrictive-type transducer is shown schematically in Figure 2. When a rod or tube of magnetostrictive material is brought into a magnetic field parallel to its length, a change in length occurs, likewise a change in length changes the magnetic field.

For example, to a plate 8 of sufficient rigidity are affixed a number of magnetostrictive rods 9. When the force F arising from the accelerated liquid 2 by virtue of an acceleration acts upon the plate 10 to push against the rod or tubes 9, the length $k$ of the rods or tubes is slightly changed. Changes in the flux linkage of the electromagnetic field surrounding the rods or tubes 9 as a result of the change in length $k$ effects voltage changes in coils 12 which are conveyed to connected circuits by means of leads 13. It is to be noted that in both instances the force due to acceleration creates a change in dimension in the transducers acted upon, this change in turn changing the electrical characteristics of the transducer. This latter change is utilized in connected circuitry, to provide a measure of the acceleration encountered.

While in order to comply with the statute, the invention has been described in language more or less specific as to structural features, it is to be understood that the invention is not limited to the specific features shown, but that the means and construction herein disclosed comprise the preferred form of several modes of putting the invention into effect. The invention is, therefore, claimed in any of its forms or modifications within the legitimate and valid scope of the appended claims.

What is claimed is:

1. A fluid stressed accelerometer comprising a substantially cubical container having independent pressure-sensitive transducers solidly mounted on each of at least two pair of opposite faces of said container so as to correspond to at least two of the three principal axes, respectively, of a body to be accelerated, said container being completely filled with liquid mercury to insure the application of adequate force components to said transducers when said container and liquid are accelerated along any of said corresponding axes, and output leads connected to each transducer, the electrical output of each transducer being electrically insulated from and separated from all other transducer outputs, whereby electrical signals are produced in respective leads corresponding to the direction of acceleration relative to said two axes.

2. Apparatus in accordance with claim 1 in which said transducers are piezoelectric crystals.

3. Apparatus in accordance with claim 1 in which said transducers are magnetostrictors.

References Cited in the file of this patent

UNITED STATES PATENTS

| | | |
|---|---|---|
| 2,484,636 | Mason | Oct. 11, 1949 |
| 2,505,364 | McSkimin | Apr. 25, 1950 |
| 2,507,770 | Claassen | May 16, 1950 |
| 2,540,720 | Forbes | Feb. 6, 1951 |
| 2,565,158 | Williams | Aug. 21, 1951 |
| 2,638,556 | Hausz | May 12, 1953 |

OTHER REFERENCES

Ketchledge, Bell Laboratories Record, vol. XXVIII, No. 12, December 1950, pages 529 to 532.